US007690344B2

(12) United States Patent
Ma et al.

(10) Patent No.: US 7,690,344 B2
(45) Date of Patent: Apr. 6, 2010

(54) METHOD AND APPARATUS FOR SUPPORTING STOP-AND-GO ENGINE FUNCTIONALITY

(75) Inventors: Qi Ma, Farmington Hills, MI (US); Hsu-Chiang Miao, Troy, MI (US); Kenneth J. Shoemaker, Highland, MI (US); Thomas R. Brown, Shelby Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/178,694

(22) Filed: Jul. 24, 2008

(65) Prior Publication Data

US 2010/0018505 A1 Jan. 28, 2010

(51) Int. Cl.
*B60W 10/04* (2006.01)
*F02N 17/00* (2006.01)

(52) U.S. Cl. .............................. 123/179.3; 123/179.17; 123/450; 477/107; 477/110; 477/115; 417/223

(58) Field of Classification Search .............. 123/179.3, 123/179.17; 477/107, 110, 115; 417/216, 417/223, 254, 470
See application file for complete search history.

(56) References Cited

U.S. PATENT DOCUMENTS 3,695,783 A * 10/1972 Soyland et al. .............. 417/216
6,959,238 B2 * 10/2005 Morishita et al. ............. 701/54
2008/0056912 A1 * 3/2008 Pizzichil et al. ............. 417/223
2008/0247882 A1 * 10/2008 Earhart et al. ............... 417/216

OTHER PUBLICATIONS

Anonymous; An Arrangement for Fuel System Priming With Spark Ignition Direct Fuel Injection; Research Disclosure, Feb. 2006, Pub. No. 502090.

* cited by examiner

*Primary Examiner*—Stephen K Cronin
*Assistant Examiner*—Raza Najmuddin
(74) *Attorney, Agent, or Firm*—Quinn Law Group, PLLC

(57) ABSTRACT

A vehicle includes a direct-start engine and a fuel rail with a threshold fuel pressure, a transmission having a threshold fluid pressure, and a fuel delivery system. The system has a controller, a motor having a shaft, and an integrated pump assembly including a high-pressure (HP) fuel pump and a low-pressure (LP) fluid pump each connected to the shaft. Threshold pressures are maintained during the predetermined engine state, which includes an engine idling and an engine cranking state. A method for providing stop-and-go functionality in a vehicle having a direct-start engine includes detecting a current engine state, rotating a motor shaft to energize a secondary HP fuel pump at a first threshold pressure during engine cranking, and rotating the shaft to energize an LP fluid pump at a second threshold pressure during engine idling and engine cranking. The secondary pumps can also be used when primary pumps are temporarily inoperable.

7 Claims, 3 Drawing Sheets

METHOD AND APPARATUS FOR SUPPORTING STOP-AND-GO ENGINE FUNCTIONALITY

TECHNICAL FIELD

The present invention relates to a method and apparatus for supporting stop-and-go functionality in a vehicle having an engine with a direct-start capability, i.e., with the capability of starting without always requiring cranking assistance from a starter motor.

BACKGROUND OF THE INVENTION

Fuel delivery systems for use with internal combustion engines are available in many different varieties, with two of the more common being the port fuel injection (PFI) system and the spark-ignited direct injection (SIDI) system. A PFI system utilizes a series or bank of fuel injectors each delivering a calibrated amount of fuel to an inlet port of an associated combustion chamber in the engine. In a SIDI system, a fuel injector is provided within each cylinder head of the engine. The injector injects a predetermined amount of fuel directly into the combustion chamber rather than to the inlet port. Fuel pressures within the combustion chamber can be orders of magnitude greater than the pressures which are present at the inlet port, and therefore certain components of a SIDI system operate at a higher relative fuel pressure than do the similar components of a PFI system. As a result, a SIDI system-equipped engine can provide a higher peak power level than can a PFI system-equipped engine, and thus improved relative fuel economy and emissions levels, due in large part to the precise metering of the fuel and an improved intake of air into the combustion chamber of the SIDI engine.

When an internal combustion engine is idling, fuel continues to be consumed by the engine for the purpose of running or powering the various vehicle systems and accessories. In a PFI engine mated with a conventional automatic transmission, engine flare control during a transition to a run state from an idle state during cranking can be less than optimal due in part to air loop dynamics and homogeneous fuel combustion constraints. Also, while the higher initial fuel pressures provided by a SIDI engine, or other direct-start engine styles such as a diesel engine, provide certain efficiency gains relative to the PFI engine, neither engine design is optimally constructed for maintaining automatic transmission functionality when the engine is off, or during rapid cranking and starting of the engine from an idling state.

SUMMARY OF THE INVENTION

Accordingly, a system and a method are provided for optimizing engine idle shutdown or "stop" and restart or "go" functionality of a vehicle equipped with a direct-start engine, such as a SIDI engine or a diesel engine, and with an automatic transmission. The system and method maintain fuel pressure at or in the fuel rails at a threshold level during a predetermined engine state, such as while the vehicle is actively cranking and starting, or when a primary fuel pump is temporarily down or inoperable. The system and method also maintain fluid pressure within the transmission at a threshold level during various predetermined engine states, such as while the vehicle is actively cranking and starting, and/or while the engine is idling/off. In this manner, the amount of time required for starting or restarting the engine is minimized. Furthermore, because fluid pressure within the transmission is maintained at or above a threshold pressure whenever the engine is off during the predetermined engine states of idling/off and cranking/starting, a transmission controller can quickly select the appropriate gear ratios while regulating operation of the torque converter, thereby enabling a rapid and smooth vehicle launch.

In particular, a vehicle includes an engine having direct-start capability and a fuel rail with a threshold fuel pressure, an automatic transmission having a threshold fluid pressure, and a fuel delivery system. The fuel delivery system includes a motor having a rotatable shaft, and also includes an integrated pump assembly having a secondary high-pressure (HP) fuel pump and a secondary low-pressure (LP) fluid pump, with each pump being operatively connected to the shaft. The shaft energizes the pump assembly in different ways during a predetermined engine state, such as an idling/off engine state and an active cranking/starting state, to maintain one or both of the threshold fuel and fluid pressures, depending on which one of the HP fuel pump and/or LP fluid pumps is energized.

The secondary pumps can be housed or otherwise contained within a common outer casing or housing, and which can then be coupled or attached to an existing or off-the shelf starter motor in order to optimize the use of available packaging space and/or component interchangeability within the vehicle. The shaft is driven by the motor, and in one embodiment selectively rotates or drives a cam to thereby energize the HP fuel pump. To do so, the shaft is continuously connected to one member of a planetary gear set, with another member of the gear set being selectively braked or locked to enable torque from the shaft to be transitioned to a cam via other members of the gear set.

According to one embodiment of the locking mechanism, a locking band is selectively tightened or released around an outer ring gear member as needed to transfer torque to a plurality of pinion gears, and ultimately to the cam. The locking band can be tightened using an actuator, although other locking mechanism designs, whether or not a locking band is used, can be envisioned within the scope of the invention. The locking mechanism can be engaged only during a predetermined engine state or states, such as during active engine cranking or when a primary fuel pump is inoperable, and can be disengaged at other times, so that sufficient fuel pressure can be maintained via the secondary LP fluid pump.

A system optimizes stop-and-go functionality in a vehicle having a direct start engine, and includes a controller for determining or identifying a current engine state, a motor having a shaft, and a locking mechanism for transferring torque from the shaft to a cam. When the motor is energized, the HP fuel pump and LP fluid pump can be energized by the shaft at the same time or at different times, depending on the status of the locking mechanism. Torque is transferred from the shaft to power or energize the LP fluid pump whenever the motor is energized or on, such as when the current engine state is engine idling/off, during engine cranking, when a production or primary fluid pump is inoperable, etc. The shaft energizes the secondary HP fuel pump when the current engine state is the active engine cranking/starting state, or when a primary fuel pump is inoperable. In this manner, threshold fuel and fluid pressures are maintained.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
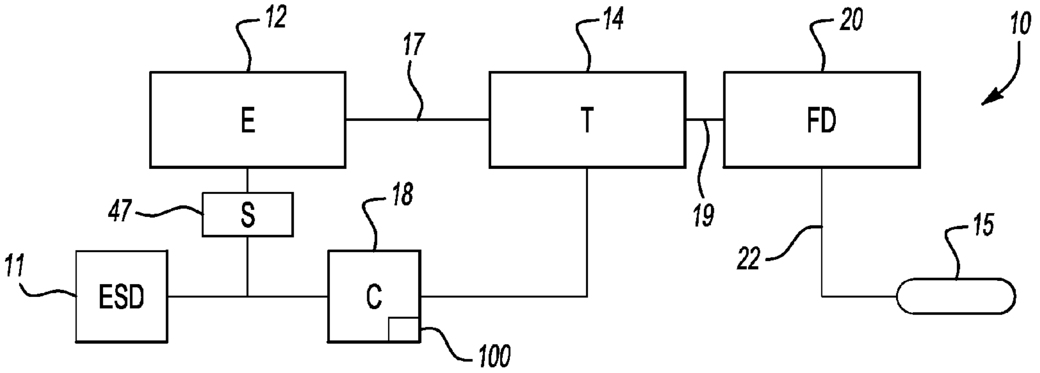
FIG. 1 is a schematic illustration of a vehicle having a fuel delivery system and control method in accordance with the invention.

Referring to the drawings wherein like reference numbers represent like components throughout the several figures, and beginning with FIG. 1, a vehicle 10 includes a direct fuel delivery system (S) 47, with the system 47 being described in more detail below with reference to FIGS. 2 and 3. The vehicle 10 includes an engine (E) 12, which can be configured as a spark-ignited direction injection (SIDI) engine, a diesel engine, or any other engine having direct start capability. As used herein, and as will be understood by those of ordinary skill in the art, the term "direct start capability" refers to the capability of an engine to be started most of the time without the assistance of cranking, although in some limited circumstances cranking may be required, i.e., when the engine 12 is not in the correct position to allow direct starting. That is, in a direct start engine, whenever a piston (not shown) is positioned within a particular range within a cylinder (not shown), the direct injection of pressurized fuel into the cylinder and subsequent sparking of the injected fuel is sufficient for directly starting the engine 12. In such a system, motor-assisted cranking is required usually less than 5% the time.

The engine 12 is coupled or connected to an input member 17 of an automatic transmission (T) 14, with the transmission 14 being configured for transferring torque generated by the engine 12 to an output member 19. The output member 19 in turn can be coupled or connected to a final drive assembly (FD) 20 of the type known in the in art, such as one or more planetary gear sets or other elements suitable for providing a final gear reduction. The final drive assembly 20 ultimately rotates or powers a drive shaft or axle 22 or multiple drive shafts or axles, and a set of road wheels 15, thereby propelling the vehicle 10.

The vehicle 10 includes an energy storage device (ESD) 11 such as a battery or other electro-chemical or electrical energy storage device, with the ESD 11 operable for selectively energizing various portions or components of the system 47 as described below with reference to FIGS. 2 and 3. An electronic control unit or controller 18 selectively controls various operations or functions of the engine 12 and the system 47 according to a method or algorithm 100 which is resident within the controller 18, or which is otherwise readily accessible by the controller 18, with the algorithm 100 described in more detail below with reference to FIG. 5. The engine 12 can be selectively shut down or turned off during idle conditions so as to minimize fuel consumption and improve the overall fuel economy of the vehicle 10, with the system 47 and algorithm 100 being used to ensure rapid restart or "stop-and-go" functionality of the vehicle 10.

Figure 2:
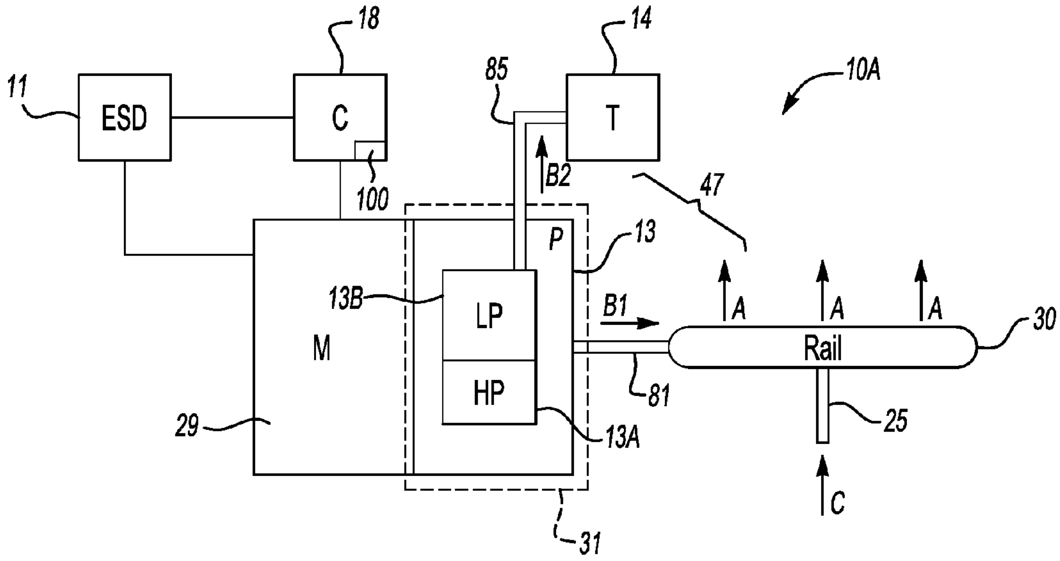
FIG. 2 is a schematic illustration of a portion of the vehicle of FIG. 1.

Referring to FIG. 2, a portion 10A of the vehicle 10 of FIG. 1 includes the system 47, the controller 18, and the ESD 11. The system 47 delivers pressurized fuel (arrow B) through a conduit 81 to a high-pressure fuel rail 30, and delivers low-pressure fuel (arrow B2) through a conduit 85 into the transmission 14. The high-pressure fuel (arrow B) enters the high-pressure fuel rail 30, also labeled as "rail" in FIG. 2, for direct injection into the combustion chamber (not shown) of the engine 12, as indicated by the arrows A. Those skilled in the art will recognize that the fuel rail 30 may operate as a manifold for feeding or providing multiple fuel injectors (not shown) of the fuel rail 30 with a sufficient amount of pressurized fuel. The fuel rail 30 is connected to a production or primary high-pressure fuel pump (not shown) via a fuel inlet 25, which admits a supply of high-pressure fuel (arrow C) into the fuel rail 30 during normal vehicle operations, i.e., when the engine 12 is running.

The system 47 includes an electrical starter motor (M) 29, such as a suitably sized brushed or brushless DC motor device, which drives, rotates, or otherwise powers a shaft 33 which is shown in two segments or portions 33A, 33B (see FIG. 3), with the portion 33A being positioned within the motor 29, and with the portion 33B being an integrally formed or operatively connected extension of the portion 33A. The controller 18 controls the on/off state of the motor 29 as well as the engagement/disengagement of the motor 29 with the engine 12 as needed, such as to electrically assist or crank the engine 12 when such assistance is needed. The motor 29 can be selectively energized using electrical current supplied from the ESD 11 to rotate at a speed $N_X$ which varies based on or in accordance with a predetermined engine state, mode, or operating condition. That is, the speed $N_X$ varies between a maximum speed value and a minimum speed value depending on the particular engine state, increasing during cranking and decreasing during idling conditions, as will be described later hereinbelow with reference to FIG. 5.

Within the scope of the invention, an integrated pump assembly (P) 13 is selectively energized or powered exclusively by the motor 29 via the shaft 33, with the pump assembly 13 including a high-pressure secondary fuel pump 13A, referred to hereinafter as the HP fuel pump 13A, and a low-pressure secondary hydraulic transmission fluid pump 13B, referred to hereinafter as the LP transmission pump 13B. As used herein, the term "integrated pump assembly" refers to any assembly in which the pumps 13A, 13B are connected to each other or contained or enclosed within a common outer casing or housing 31. This housing 31 can be readily connected to an existing or off-the-shelf or production motor 29 to thereby maximize the reuse capability of existing motor designs while conserving valuable packaging space within the vehicle 10. However, separate pump housings may also be used within the scope of the invention, depending on the particular design and/or packaging limitations of the vehicle 10 (see FIG. 1).

A production or a "primary" fuel pump and transmission pump (not shown) deliver any required fuel and hydraulic fluid pressure, respectively, in the conventional manner whenever the engine 12 is running. Likewise, the "secondary" pumps, i.e., the HP fuel pump 13A and the LP transmission pump 13B, deliver any required fuel and hydraulic fluid pressure, respectively, to maintain a respective threshold fuel pressure to the rail 30 and fluid pressure in the transmission 14 when the primary pumps (not shown) are inoperable, whether due to a maintenance issue or whenever the engine 12 is idling/off and/or during active cranking, or in other words during stop-and-start or stop-and-go engine operations. Therefore, using the algorithm 100 the controller 18 can selectively activate or energize either or both of the pumps 13A, 13B as needed depending on a predetermined engine state or states in order to maintain a required threshold level of fuel pressure and transmission fluid pressure for certain periods of potentially high demand, and during engine idling/off and active cranking and starting in particular. In this manner, a relatively rapid and smooth launch of the vehicle 10 of FIG. 1 is enabled.

Figure 3:
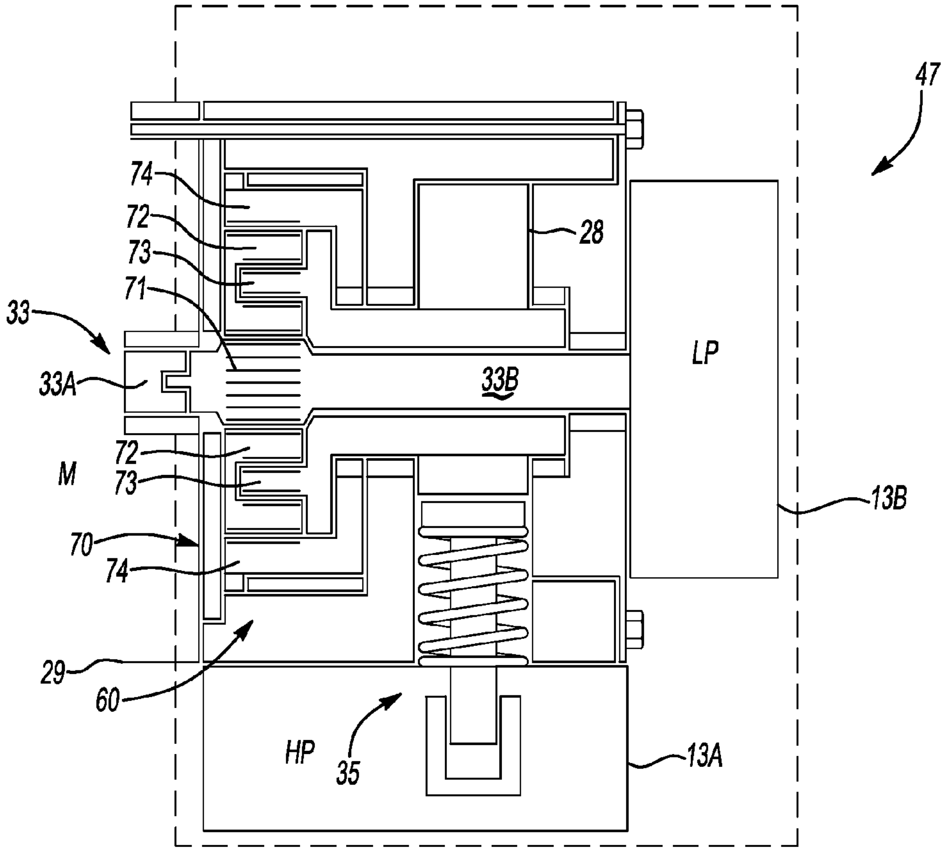
FIG. 3 is a schematic illustration of an exemplary embodiment of a fuel delivery system usable with the vehicle of FIGS. 1 and 2.

Referring to FIG. 3, the system 47 of FIG. 2 includes the motor 29 and the integrated pump assembly 13, i.e., the HP fluid pump 13A and the LP fluid pump 13B. The shaft portion 33B of the shaft 33 is continuously connected to or formed integrally with a first member 71 of a planetary gear set 70, such as an inner sun gear member as described below with reference to FIG. 4. The first member 71 is continuously engaged with a plurality of second members 72, such as a set of pinion gears, which are rotatably supported on a third member 73, such as a planetary carrier of the type known in the art. Each third member is continuously connected to or formed integrally with a cam 28, such as a single or a multi-lobed device of the type known in the art. Therefore, the rotation of the third member 73 or planetary carrier rotates the cam 28, which in turn actuates the HP fluid pump 13A. The gear set 70 also includes a fourth member 74, such as an outer ring gear member, which can be selectively locked or grounded.

In particular, a locking mechanism 60 is used to selectively lock the fourth member 74 of the gear set 70, and to thereby transmit torque from the shaft 33 to the third member 73. Rotation of the third member 73 rotates the cam 28 to thereby energize or power the HP fuel pump 13A at selected times when the motor 29 is energized. For example, rotation of the shaft 33 when the locking mechanism 60 is engaged or applied can ultimately rotate the cam 28, which in turn can move a plunger assembly 35 of the type known in the art to alternately admit and discharge fuel with respect to the HP fuel pump 13A. At the same time, rotation of the shaft 33 transmits torque from the motor 29 into the LP fluid pump 13B, thereby continuously energizing or powering the pump 13B via internal gears (not shown) or another suitable drive mechanism whenever the motor 29 is energized, irrespective of the energized state of the HP fuel pump 13A.

The HP fuel pump 13A and the LP fluid pump are driven or energized by the shaft 33 when the engine 12 (see FIG. 1) is in an active cranking and starting state, and/or when a corresponding production or primary fuel and fluid pump are inoperable, such as due to a maintenance issue. The LP fluid pump 13B can also be driven or energized whenever the engine 12 is idling/off in order to maintain a sufficient threshold fluid pressure within the transmission 14 (see FIGS. 1 and 2). Whenever the engine 12 (see FIG. 1) is shut down during normal operation to conserve fuel, such as while idling with the engine off at a stop light or when the vehicle 10 of FIG. 1 is parked on an incline, the controller 18 can command or signal the motor 29 to energize the shaft 33 in order to temporarily power the LP fluid pump 13B, thus maintaining a sufficiently high level or threshold level of fluid pressure in the transmission 14 (see FIGS. 1 and 2). When the engine 12 is actively cranking, the controller 18 can also engage the locking mechanism 60 to temporarily power the HP fuel pump 13A, thus maintaining a sufficiently high level or threshold level of fuel pressure at the rail 30 (see FIG. 2) for rapid engine restart and/or launch.

In other words, regardless of whether the HP fuel pump 13A is energized, the motor 29 can power or energize the LP fluid pump 13B to maintain a threshold level of fluid pressure within the transmission 14 (see FIG. 1) to ensure rapid response of the transmission 14 during certain operating states, such as when the engine 12 of FIG. 1 is off and the vehicle 10 (see FIG. 1) is parked or idling on an inclined surface, during cranking, or any other situation in which the engine 12 is off and the transmission 14 requires continuing functionality. As will be understood by those of ordinary skill in the art, the speed $N_X$ at which the shaft 33 rotates is increased whenever the engine 12 is cranked, due to the spike or temporary increase in load on the motor 29, and this speed is maintained until the engine 12 has been started. Thereafter, the speed $N_X$ is reduced, and when functionality of the HP fuel pump 13A is no longer required, the locking mechanism 60 can be disengaged in order to stop the cam 28 from rotating. When the engine 12 has started, the motor 29 can be shut off or de-energized until needed.

Figure 4:
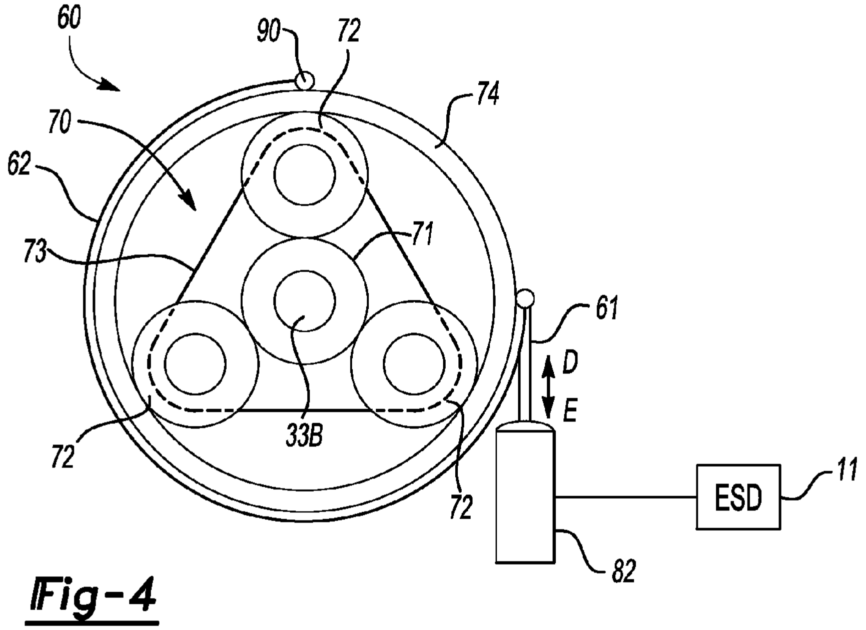
FIG. 4 is a schematic illustration of a locking mechanism usable with the fuel delivery system of FIG. 3.

Referring to FIG. 4, an exemplary embodiment is provided for the locking mechanism 60 of FIG. 3. The locking mechanism 60 includes a locking band 62 which at least partially circumscribes the fourth member 74 of the planetary gear set 70. The gear set 70 includes the fourth member 74, which is exemplified here as a ring gear member, the second members 72, exemplified here as a set or plurality of pinion gears 72 each rotatably supported by or on the third member or a carrier 73. The first member 71 is exemplified as an integrally formed sun gear member.

By engaging the locking mechanism 60, the gear set 70 transfers torque from the motor 29 to the cam 28 (see FIG. 3) via the third member 73 only when the ring gear member 74 is locked or prevented from rotating. The locking mechanism 60 can be selectively engaged as determined by the controller 18 (see FIGS. 1 and 2) based on a predetermined engine state or other operating condition, for example during "hill-holding" when the vehicle 10 of FIG. 1 is idling on a sloped surface with the engine 12 off. In such a situation, to ensure functionality of the transmission 14 (see FIGS. 1 and 2), the LP fluid pump 13B remains energized by the motor 29 (see FIGS. 2 and 3) by unlocking the locking mechanism 60.

To that end, an actuator 82, such as an electro-mechanical solenoid device or another suitable electro-mechanical device, or alternately a fluid-powered rotary or linear actuator device or other suitable device (not shown), can be connected to a linkage 61. In order to lock the fourth or ring gear member 74, the actuator 82 is energized by the ESD 11 or another energy source and moves or pulls the linkage 61 in the direction of arrow D, thus tightening the locking band 62 around the circumference of the ring gear member 74. The locking band 62 reacts against a stationary member 90. The actuator 82 continues to increase tension on the locking band 62 against the stationary member 90 until rotation of the fourth member or ring gear member 74 is prevented, thus engaging the locking mechanism 60.

Likewise, to unlock the fourth member 74, i.e., the ring gear member, and to discontinue the transfer of torque from the motor 29 (see FIG. 3) to the third member 73 or carrier, and therefore to the cam 28, the actuator 82 is de-energized or energized in such a way as to enable movement of the linkage 61 in the direction of arrow E, thus reducing tension on the locking band 62 and allowing the ring gear member 74 to freely rotate without transferring torque to the third member 73 or carrier. As will be understood by those of ordinary skill in the art, the locking mechanism 60 of FIG. 4 is just one possible embodiment for selectively locking and unlocking the fourth member 74, and those of ordinary skill in the art will recognize other devices and methods, such as clutches, brakes, locking pins, or other suitable devices, which can be used to selectively transfer torque from a rotating shaft such as the shaft 33 to a cam 28 in order achieve the same result without deviating from the intended scope of the invention.

Figure 5:
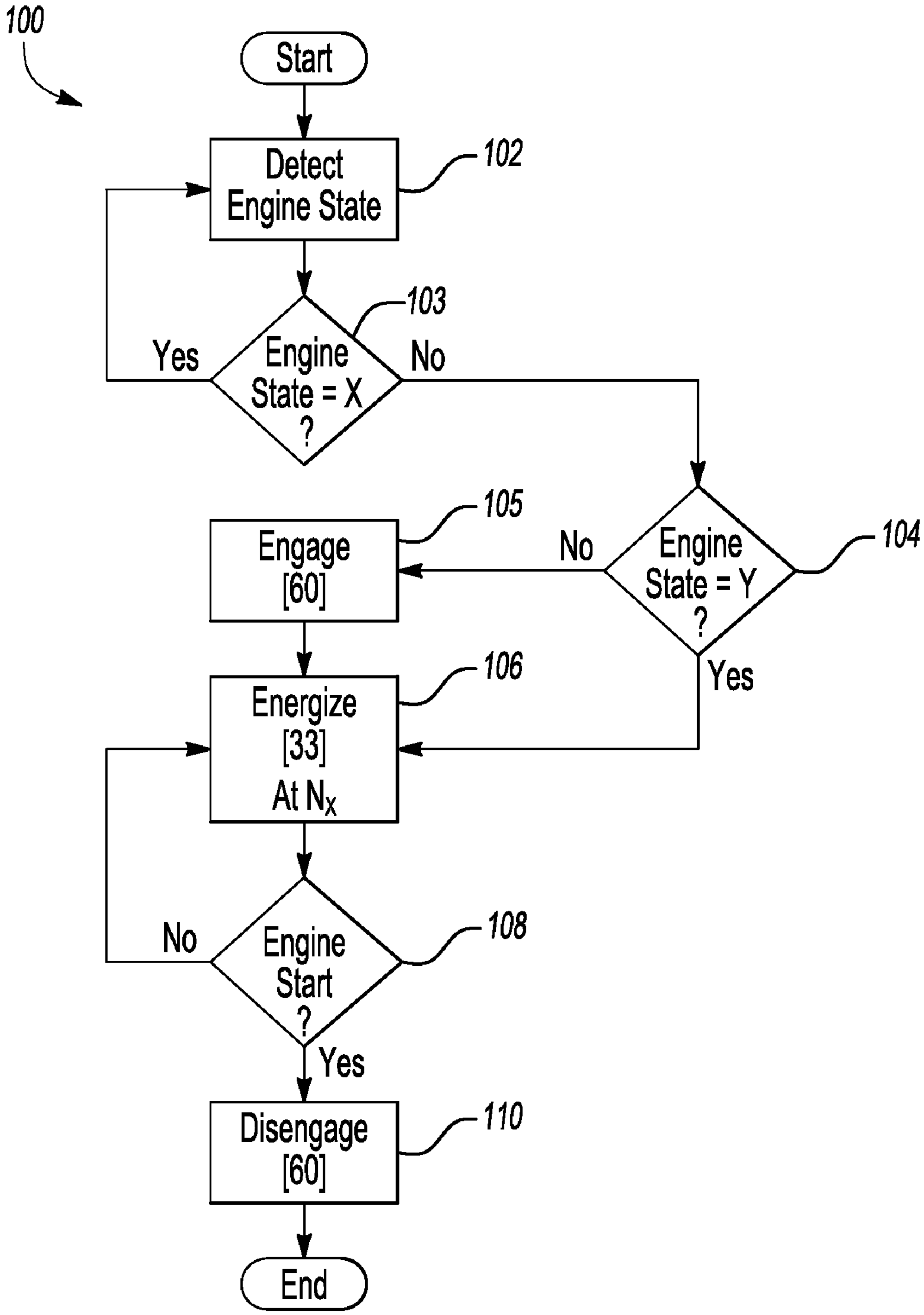
FIG. 5 is flow chart describing the control method or algorithm of FIG. 1.

Referring to FIG. 5, the method or algorithm 100 of FIGS. 1 and 2 is shown in more detail, with the algorithm 100 beginning with step 102. At step 102, a current engine condition or state is detected, sensed, or otherwise determined, with the current engine state describing whether the engine 12 of FIG. 1 is in an actively running state, abbreviated "X" in FIG. 5, and idling/off engine state (Y), or an actively cranking/starting engine state (Z). Alternately or concurrently, the state X can also include a state in which an error or maintenance issue is determined with respect to the operating status of a production or primary fuel or fluid pump (not shown), thus requiring temporary assistance from one or both of the pumps 13A, 13B of FIGS. 2 and 3. Once the current engine state X, Y, or Z is determined, the algorithm 100 proceeds to step 103.

At step 103, the algorithm 100 determines whether the current engine state X, Y, or Z determined at step 102 is the engine state X corresponding to an actively running engine 12 (see FIG. 1). If so, the algorithm 100 repeats step 102 until engine states Y or Z are detected, otherwise proceeding to step 104.

At step 104, the algorithm 100 determines whether the current engine state determined at step 102 is the engine state Y. i.e., an engine idling/off state. If so, the algorithm 100 proceeds to step 106, otherwise the algorithm 100 proceeds to step 105.

At step 105, after having determined by default or directly at steps 102 and/or 104 that the current engine state is engine state Z or active engine cranking/starting, the algorithm 100 engages the locking mechanism 60 (see FIGS. 2 and 3). This step can entail, for example, energizing the actuator 82 of FIG. 4 in order to thereby tighten the locking band 62, engaging a brake or locking pin (not shown), or any other means of engagement. Once the locking mechanism 60 is fully engaged, the algorithm 100 proceeds to step 106.

At step 106, the motor 29 energizes or rotates the shaft 33 of FIG. 2 at the speed $N_X$, which is sufficient for supporting the engine states Y or Z, as determined above at step 104. For example, an engine state corresponding to engine state Z or an actual or present cranking and starting of the engine 12 will require a higher motor speed than would be required for an engine state corresponding to only an imminent or impending engine starting and cranking, that is, to an engine state of idling/engine off or state Y. Once the shaft 33 is energized as needed, the algorithm 100 proceeds to step 108.

At step 108, the algorithm 100 senses, measures, detects, or otherwise determines whether the engine 12 (see FIG. 1) has fully started. If the engine 12 has not yet fully started, the algorithm 100 returns to step 106 and repeats steps 106 and 108 in a loop until such an operating condition or engine state is detected. That is, the motor 29 (see FIGS. 1, 2, and 3) continues to rotate at the speed $N_X$ as determined at step 106 until the engine 12 has been started, after which the algorithm 100 proceeds to step 110.

At step 110, having determined that the engine 12 has been started, the algorithm 100 disengages the locking mechanism 60, and/or otherwise stops rotation of the shaft 33 (see FIG. 3) such as by de-energizing or turning off the motor 29 of FIGS. 1, 2, and 3. Step 110 might be executed by de-energizing the actuator 82 of FIG. 4, if such an embodiment is used, to thereby loosen the locking band 62, or by any other suitable means depending on the particular design of the locking mechanism 60 (see FIGS. 3 and 4). Once the locking mechanism 60 is disengaged, the algorithm 100 shuts off the motor 29 if it has not already done so, and all fuel and fluid pressure requirements are transitioned to the primary fuel and fluid pumps (not shown).

While the best modes for carrying out the invention have been described in detail, those familiar with the art to which this invention relates will recognize various alternative designs and embodiments for practicing the invention within the scope of the appended claims.

The invention claimed is:

1. A system for optimizing stop-and-go functionality in a vehicle having an automatic transmission and a direct-start engine, the system comprising:

a controller operable for determining the presence of a current engine state;

a motor having a shaft, the motor being energized when the controller determines the presence of a current engine state corresponding to one of a first and a second predetermined engine state;

an integrated pump assembly including a high-pressure (HP) fuel pump that is selectively connected to the shaft for maintaining a threshold fuel pressure to a fuel rail during the second predetermined engine state, and a low-pressure (LP) fluid pump directly and continuously connected to the shaft for maintaining a threshold fluid pressure in the automatic transmission during each of the first and the second predetermined engine states;

a cam; and a locking mechanism operable for transferring torque from the shaft to the cam for energizing the HP fuel pump only when the current engine state corresponds to the first predetermined engine state.

2. The system of claim 1, wherein the engine is configured as one of a spark-ignited direct injection (SIDI) engine and a diesel engine.

3. The system of claim 1, further comprising an actuator, wherein the controller is adapted for energizing the actuator to thereby engage the locking mechanism, and for de-energizing the actuator to thereby disengage the locking mechanism.

4. The system of claim 3, wherein the locking mechanism is a locking band, and wherein the actuator is a solenoid device configured for selectively tightening the locking band; and wherein tightening the locking band thereby brakes a ring gear member of a planetary gear and transfers torque from the shaft to the cam.

5. A method for providing stop-and-go functionality in a vehicle having a direct-start engine, a fuel rail, a transmission, a motor having a shaft, and an integrated pump assembly operatively connected to the shaft and energized thereby, wherein the integrated pump assembly has a secondary low-pressure (LP) fluid pump continuously connected to a the shaft and a secondary high-pressure (HP) fuel pump selectively connected to the shaft, the method comprising:

detecting a current engine state;

rotating the shaft to thereby energize the secondary LP fluid pump when the current engine state is one of an engine idling state and an engine cranking state, thereby maintaining a threshold fluid pressure in the transmission; and rotating the shaft to thereby energize the secondary HP fuel pump when the current engine state is an engine cranking state, thereby maintaining a threshold fuel pressure in the fuel rail.

6. The method of claim 5, including a cam, wherein the vehicle includes a locking mechanism configured for selectively transferring torque from the shaft to the cam for energizing the secondary HP fuel pump when the current engine state is an engine cranking state.

7. The method of claim 6, including a planetary gear set having an outer ring gear, a carrier, a plurality of pinion gears operatively connected to the cam and rotatably supported by the carrier, and an inner sun gear which is continuously connected to the shaft;

wherein rotating the shaft while engaging the locking mechanism thereby grounds the outer ring gear and transfers torque from the shaft to carrier, thereby rotating the cam.

* * * * *